(12) United States Patent
Yanagawa et al.

(10) Patent No.: US 8,955,785 B2
(45) Date of Patent: Feb. 17, 2015

(54) WEBBING WINDING DEVICE

(75) Inventors: Wataru Yanagawa, Aichi-ken (JP);
Yoshiaki Maekubo, Aichi-ken (JP);
Masaru Ukita, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 180 days.

(21) Appl. No.: 13/525,238

(22) Filed: Jun. 15, 2012

(65) Prior Publication Data
US 2012/0318903 A1    Dec. 20, 2012

(30) Foreign Application Priority Data
Jun. 20, 2011    (JP) .................... 2011-136391

(51) Int. Cl.
*B60R 22/28*    (2006.01)
(52) U.S. Cl.
CPC ........... *B60R 22/28* (2013.01); *B60R 2022/287* (2013.01)
USPC .......................... 242/379.1; 297/470; 280/805
(58) Field of Classification Search
USPC ................ 242/379.1; 297/470; 280/806, 805
See application file for complete search history.

(56) References Cited

U.S. PATENT DOCUMENTS 5,967,441 A * 10/1999 Kohlndorfer et al. ...... 242/379.1
6,047,914 A *  4/2000 Sasaki ......................... 242/379.1
7,744,029 B2 *  6/2010 Gentner ...................... 242/379.1

FOREIGN PATENT DOCUMENTS

JP    2011-225719    6/2011

* cited by examiner

*Primary Examiner* — Sang Kim
(74) *Attorney, Agent, or Firm* — Roberts Mlotkowski Safran & Cole P.C.

(57) ABSTRACT

In a webbing winding device, a sub-torsion shaft is inserted from one side in the axial direction of a spool into the spool when assembling the sub-torsion shaft to the spool. Subsequently, by the sub-torsion shaft rotating in the winding direction, movement of the sub-torsion shaft with respect to the spool in the winding direction and in one side in the axial direction is inhibited. Subsequently, by a stopper being fitted from one side in the axial direction into insertion groove portions, movement of the sub-torsion shaft with respect to the spool in the pull out direction is inhibited. Accordingly, since the direction in which the sub-torsion shaft is assembled to the spool becomes only a direction parallel to the axial direction of the spool, the assembly of the sub-torsion shaft with respect to the spool may be improved.

13 Claims, 11 Drawing Sheets

WEBBING WINDING DEVICE

CROSS-REFERENCE TO RELATED APPLICATION

This application claims priority under 35 USC 119 from Japanese Patent Application No. 2011-136391 filed Jun. 20, 2011, the disclosure of which is incorporated by reference herein.

BACKGROUND OF THE INVENTION

1. Field of the Invention

The present invention relates to a webbing winding device in which a spool is provided with a torsion shaft.

2. Related Art

In a webbing winding device disclosed in Japanese Patent Application Laid-Open (JP-A) No. 2001-225719, a torsion bar is inserted into a reel along the axial direction of the reel so as to disable the relative rotation between the reel and the torsion bar. Furthermore, a holder member is press-inserted into the reel directed along the radial direction of the reel, so a second torque transmitting portion of the torsion bar comes into contact with the holder member so as to disable the separation of the torsion bar from the reel.

However, in the webbing winding device, as described above, the direction in which the torsion bar is inserted into the reel becomes the axial direction of the reel, but the direction in which the holder member is press-inserted into the reel becomes the radial direction of the reel. For this reason, in order to assemble the torsion bar to the reel, the torsion bar and the holder member need to be assembled to the reel in the intersection directions. As a result, the assembly is poor.

SUMMARY OF THE INVENTION

The invention has been made in view of the above-described circumstances, and it is desirable to provide a webbing winding device capable of improving assembly of a torsion shaft with respect to a spool.

According to a first aspect, there is provided a webbing winding device including: a spool that is formed in a cylindrical shape and is rotatable; an insertion groove portion that is formed at an inner peripheral portion of the spool and extends in an axial direction of the spool; an engagement groove portion that is formed at the inner peripheral portion of the spool, communicates with the insertion groove portion and extends from the insertion groove portion toward one side in a rotation direction of the spool; a torsion shaft that is coaxially provided inside the spool; an engaged portion that is integrally formed with the torsion shaft, and is configured such that the engaged portion is inserted from one side in the axial direction of the spool into the insertion groove portion and is rotated from an inside of the insertion groove portion toward the one side in the rotation direction so as to engage with the engagement groove portion, whereby movement of the engaged portion with respect to the spool toward the one side in the rotation direction and the one side in the axial direction is inhibited; and an inhibiting portion that is fitted from the one side in the axial direction into the insertion groove portion and inhibits movement of the engaged portion with respect to the spool toward the other side in the rotation direction of the spool.

In the webbing winding device according to the first aspect, the spool is formed in a cylindrical shape so as to be rotatable. The inner peripheral portion of the spool is provided with the insertion groove portion and the engagement groove portion. The insertion groove portion extends in the axial direction of the spool so as to communicate with the engagement groove portion, and the engagement groove portion extends from the insertion groove portion toward the one side in the rotation direction of the spool. Furthermore, the torsion shaft is coaxially formed inside the spool.

Here, the engaged portion is integrally formed with the torsion shaft. The engaged portion is inserted from the one side in the axial direction of the spool into the insertion groove portion, and is rotated from the inside of the insertion groove portion toward the one side in the rotation direction of the spool so as to engage with the engagement groove portion. Accordingly, the movement of the engaged portion with respect to the spool toward the one side in the rotation direction and the one side in the axial direction is inhibited. Furthermore, the inhibiting portion is fitted from the one side in the axial direction of the spool into the insertion groove portion, and the movement of the engaged portion with respect to the spool toward the other side in the rotation direction of the spool is inhibited.

For this reason, the torsion shaft is inserted from the one side in the axial direction of the spool into the spool when assembling the torsion shaft to the spool. Subsequently, by the torsion shaft being rotated toward the one side in the rotation direction, the movement of the torsion shaft with respect to the spool toward the one side in the rotation direction and the one side in the axial direction is inhibited. Subsequently, by the inhibiting portion being fitted from the one side in the axial direction of the spool into the insertion groove portion, the movement of the torsion shaft with respect to the spool toward the other side in the rotation direction is inhibited. Accordingly, the torsion shaft is assembled to the spool so as not to be separable therefrom. Accordingly, the direction in which the torsion shaft is assembled to the spool becomes only a direction parallel to the axial direction of the spool.

According to a second aspect, there is provided the webbing winding device according to the first aspect, wherein the inhibiting portion is provided at the torsion shaft so as to be movable in an axial direction of the torsion shaft and be rotatable about an axis of the torsion shaft.

In the webbing winding device according to the second aspect, since the inhibiting portion is provided at the torsion shaft, the torsion shaft can be assembled to the spool while the inhibiting portion is sub-assembled with the torsion shaft. Further, the inhibiting portion is configured to be movable in the axial direction of the torsion shaft and to be rotatable about the axis of the torsion shaft. For this reason, the inhibiting portion and the insertion groove can be easily aligned with each other by rotating the inhibiting portion about the axis of the torsion shaft before the inhibiting portion is fitted into the insertion groove. Furthermore, the torsion shaft serves as a guide member when fitting the inhibiting portion into the insertion groove, so that the inhibiting portion can be moved along the axial direction of the torsion shaft.

According to a third aspect, there is provided the webbing winding device according to the first aspect or the second aspect, wherein the one side in the rotation direction corresponds to a winding direction in which a webbing is wound on the spool.

In the webbing winding device according to the third aspect, the one side in the rotation direction corresponds to the winding direction of the spool. For this reason, the engaged portion (the torsion shaft) engages with the engagement groove portion (the spool) in the winding direction. In other words, the engagement groove portion (the spool) engages with the engaged portion (the torsion shaft) in the opposite direction (the pull out direction) to the winding direction. Accordingly, the rotation of the torsion shaft is inhibited at the time of the rapid deceleration or the like of the vehicle, so that the torsion shaft is twisted, and accordingly when the rotation of the spool in the pull out direction is permitted (that is, when the force limiter mechanism is operated), the direction in which the engagement groove portion (the spool) engages with the engaged portion (the torsion shaft) is equal to the rotation direction of the spool. Accordingly, the operation of the force limiter mechanism is not affected by the inhibiting portion.

According to a fourth aspect, there is provided the webbing winding device according to any one of the first aspect to the third aspect, further including: a fastened member that is formed in a cylindrical shape, and is arranged at the one side in the axial direction with respect to the inhibiting portion so as to be integrally rotatable with the torsion shaft, the torsion shaft being disposed inside the fastened member; and a fastening member that is threaded into an end portion of the torsion shaft at the one side in the axial direction, and comes into contact with the fastened member so as to fasten the fastened member to the spool.

In the webbing winding device according to the fourth aspect, the fastened member formed in a cylindrical shape is disposed at the one side of the axial direction of the spool with respect to the inhibiting portion so as to be integrally rotatable with the torsion shaft, and the torsion shaft is disposed inside the fastened member. Further, the fastening member is threaded into the end portion of the torsion shaft at the one side in the axial direction, and the fastening member comes into contact with the fastened member so as to fasten the fastened member to the spool.

For this reason, since the movement of the inhibiting portion toward the one side in the axial direction of the spool is inhibited by the fastened member, the inhibiting portion can be made reliably so as not to be separated from the spool. Furthermore, since the position of the fastening member is set to the position where the fastening member comes into contact with the fastened member, when the fastening member is threaded into the torsion shaft, the axial force in the one side in the axial direction of the spool acts on the torsion shaft. Accordingly, the engaged portion and the engagement groove portion are fastened to each other by the axial force.

In the above aspects, it is possible that a fitting portion extending along the axial direction is provided at the inhibiting portion.

In the above aspects, it is possible that plural insertion groove portions, the engagement groove portions, the engaged portions and fitting portions are provided.

In the above aspects, it is possible that the engaged portions are provided at the torsion shaft and the fitting portions are provided at the inhibiting portion so as to correspond to positions of the insertion groove portions at the inner peripheral portion of the spool in a circumferential direction.

According to the webbing winding device of the first aspect, the assembly of the torsion shaft to the spool can be improved.

According to the webbing winding device of the second aspect, the assembly of the torsion shaft to the spool can be further improved.

According to the webbing winding device of the third aspect, the inhibiting portion can be provided without affecting the operation of the force limiter mechanism.

According to the webbing winding device of the fourth aspect, the inhibiting portion can be reliably made so as not to be separable from the spool, and the engaged portion can be fastened to the engagement groove portion.

BRIEF DESCRIPTION OF THE DRAWINGS

Embodiments of the invention will be described in detail with reference to the following figures, wherein.

DETAILED DESCRIPTION OF THE INVENTION

Figure 1:
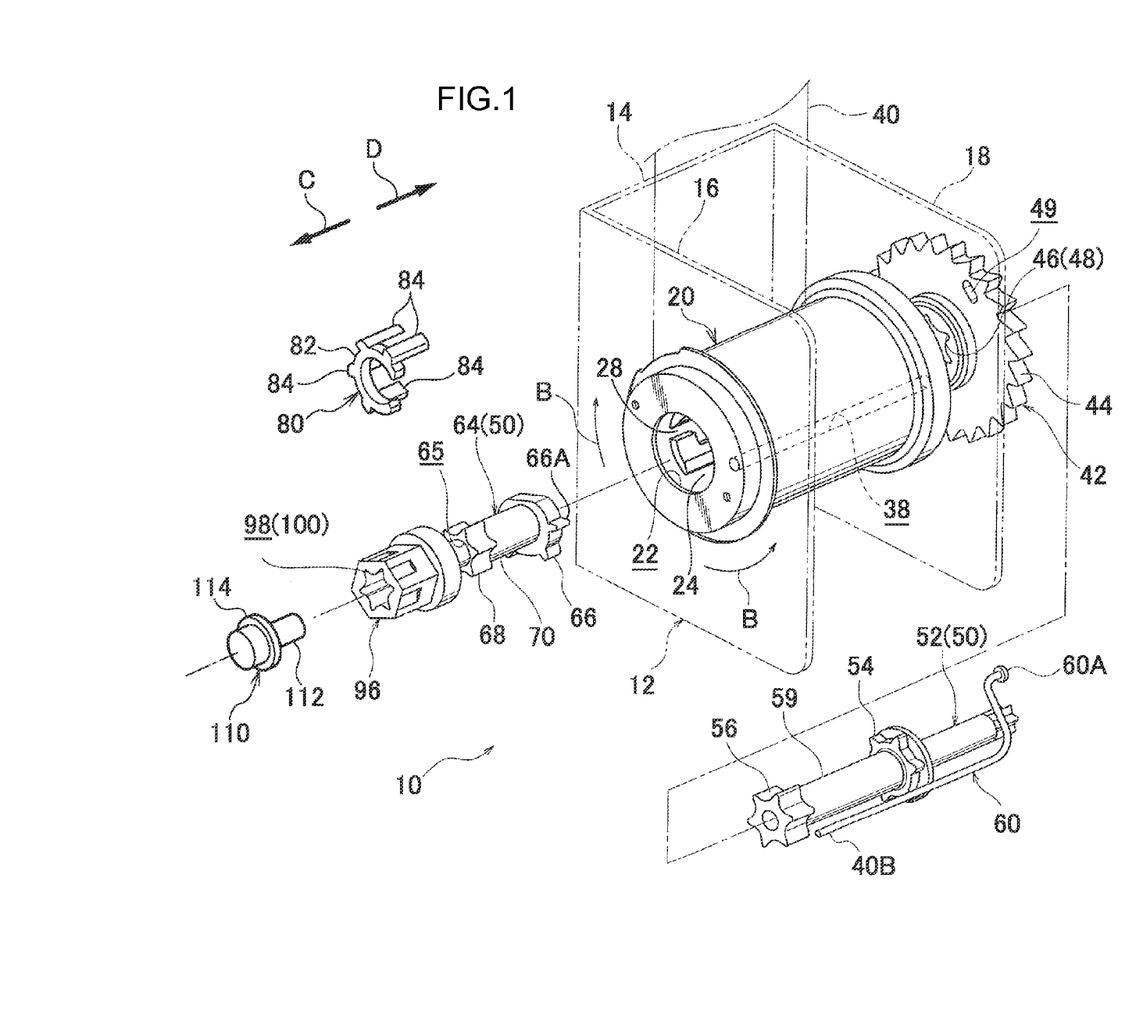
FIG. 1 is an exploded perspective view illustrating a configuration of a main portion of a webbing winding device according to an embodiment of the invention.

In FIG. 1, a main part of a webbing winding device 10 according to an embodiment of the invention is illustrated by an exploded perspective view.

As illustrated in this drawing, a webbing winding device 10 includes a frame 12. The frame 12 includes a plate-like back plate 14 which is fixed to a vehicle body. Leg pieces 16 and 18 extend in the substantially perpendicular direction from both end portions of the back plate 14 in the width direction, and the frame 12 is formed in a substantially recess shape in the top view. Furthermore, an existing lock mechanism (not shown in the drawings) is attached to the outside of the leg piece 18.

A substantially cylindrical spool 20 is formed between the leg piece 16 and the leg piece 18 of the frame 12. The spool 20 is disposed so that the axial direction becomes the opposing direction of the leg piece 16 and the leg piece 18, and is rotatably supported to the frame 12 through a main torsion shaft 52, a sub-torsion shaft 64, and the like to be described later.

A base end portion of an elongated stripe-like webbing 40 is caught (anchored) to the spool 20. When the spool 20 rotates in the winding direction (the direction indicated by the arrow A illustrated in FIG. 1) which corresponds to one side in the rotation direction, the webbing 40 is wound thereon from the base end side thereof so as to be accommodated. Further, when the webbing 40 wound on the spool 20 is reeled out, the spool 20 rotates in the pull out direction (the direction indicated by the arrow B illustrated in FIG. 1, and in a broad sense, understood as the 'other side in the rotation direction').

Figure 2:
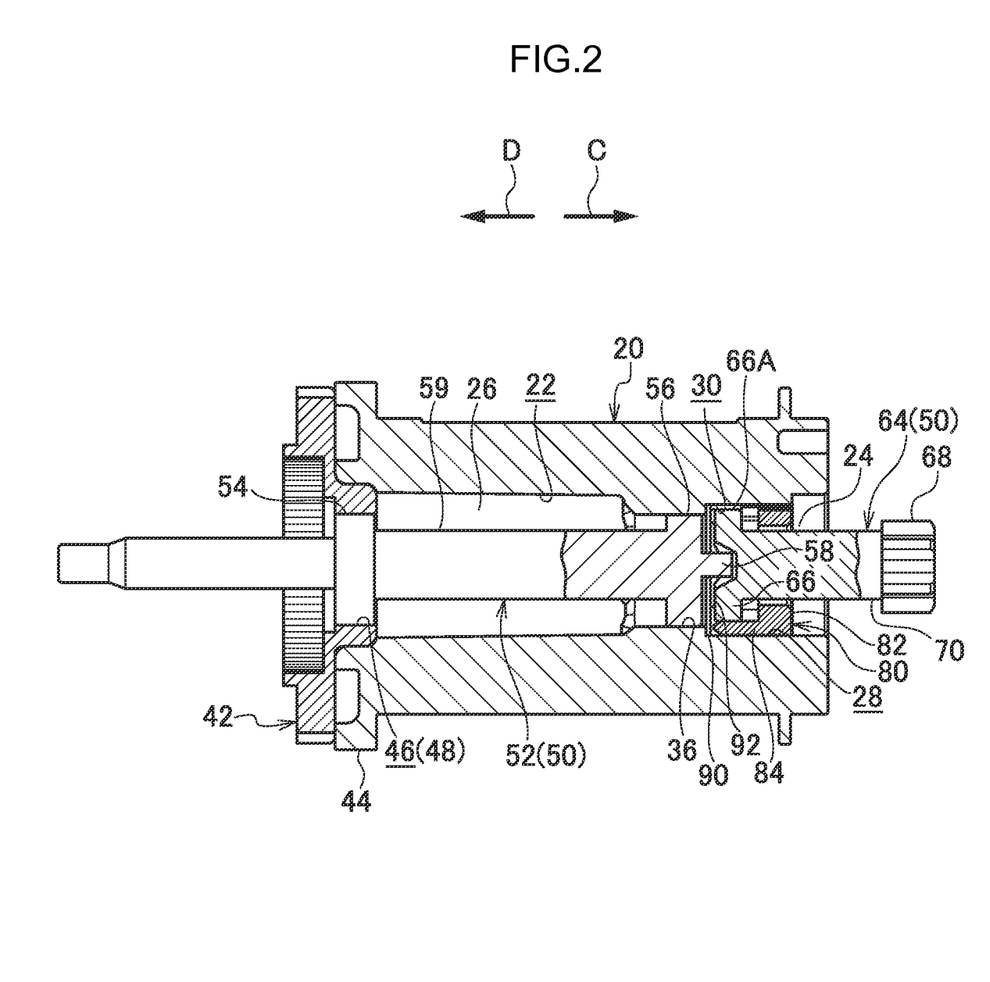
FIG. 2 is a cross-sectional view illustrating an assembly state of a main torsion shaft and a sub-torsion shaft with respect to a spool which is used in the webbing winding device illustrated in FIG. 1.

As illustrated in FIG. 2, a penetration hole 22 penetrates the axis center portion of the spool 20. The portion of the penetration hole 22 at one side in the axial direction of the spool 20 (the direction indicated by the arrow C illustrated in FIG. 1 and the like) is formed as a sub-torsion shaft accommodating portion 24 which accommodates a sub-torsion shaft 64 to be described later, and the portion of the penetration hole 22 at the other side in the axial direction of the spool 20 (the direction indicated by the arrow D illustrated in FIG. 1 and the like) is formed as a main torsion shaft accommodating portion 26 which accommodates a main torsion shaft 52 to be described later.

Figure 3:
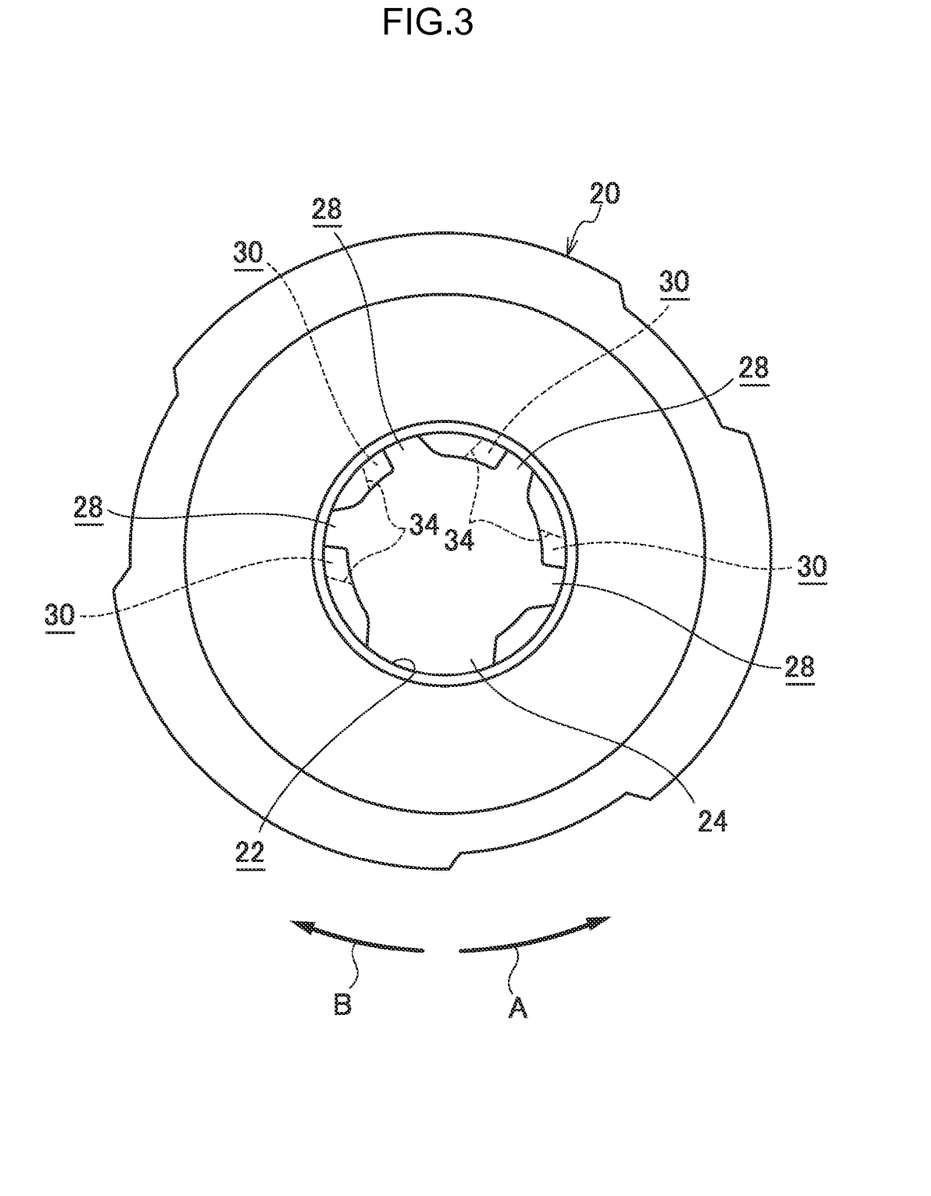
FIG. 3 is a side view when the spool illustrated in FIG. 2 is seen from one side in the axial direction.
Figure 4:
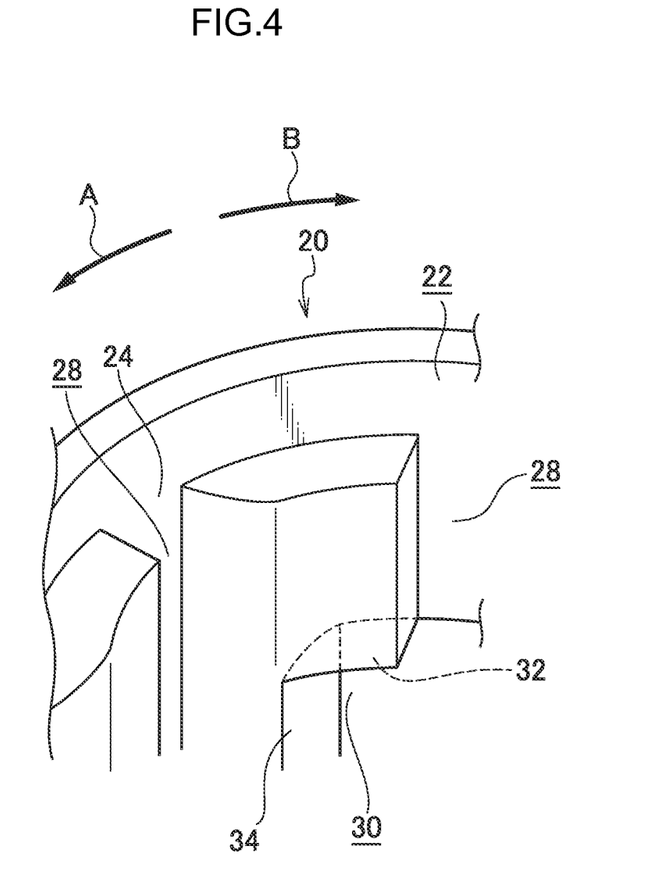
FIG. 4 is an enlarged perspective view illustrating a sub-torsion shaft accommodating portion of the spool illustrated in FIG. 2.

As illustrated in FIGS. 3 and 4, the portion of the sub-torsion shaft accommodating portion 24 at the other side in the axial direction of the spool 20 is formed so as to be smaller in diameter than the portion of the sub-torsion shaft accommodating portion 24 at one side in the axial direction of the spool 20. At the portion of the sub-torsion shaft accommodating portion 24, plural (in the embodiment, four) insertion groove portions 28 are provided. The insertion groove portions 28 are formed in a substantially trapezoid shape when seen from one side in the axial direction of the spool 20, and are opened inward in the radial direction of the spool 20. Further, the insertion groove portions 28 are arranged at a predetermined interval therebetween along the circumferential direction of the spool 20, and extend along the axial direction of the spool 20.

Further, at the sub-torsion shaft accommodating portion 24 of the spool 20, plural (in the embodiment, four) engagement groove portions 30 are provided. Each engagement groove portion 30 extends from the insertion groove portion 28 along the winding direction of the spool 20, and is opened inward in the radial direction of the spool 20. Further, each engagement groove portion 30 communicates with the portion of the insertion groove portion 28 at the other side in the axial direction of the spool 20. Furthermore, the engagement groove portion 30 is configured such that the engagement groove portion 30 does not extend from the insertion groove portion 28 which is communicated to the engagement groove portion 30 to the adjacent insertion groove portion 28. Accordingly, a surface of the engagement groove portion 30 at one side in the axial direction of the spool 20 is formed as an axial catching (anchoring) surface 32, and a surface of the engagement groove portion 30 at the side in the winding direction of the spool 20 is formed as a circumferential catching (anchoring) surface 34. The axial catching surface 32 and the engagement groove portion 30 are formed so as to be engageable with an engaged protrusion 66A of the sub-torsion shaft 64 to be described later.

As illustrated in FIG. 2, the main torsion shaft accommodating portion 26 of the spool 20 is provided with an engagement portion 36 which fixes the main torsion shaft 52 to be described later in the portion at one side in the axial direction of the spool 20, and the engagement portion 36 is formed in a spline shape.

A lock gear 42 is disposed at the other side in the axial direction of the spool 20 so as to be coaxial with the spool 20. A gear portion 44 is formed on the outer peripheral portion of the lock gear 42. Further, a penetration hole 46 which penetrates in the axial direction is formed in the axis center portion of the lock gear 42, and a spline-like engagement portion 48 is formed on the inner peripheral portion of the penetration hole 46.

In an emergency of a vehicle (at a predetermined moment such as rapid deceleration), the lock mechanism is operated by detecting a state where the acceleration of the vehicle (especially, the reducing-acceleration (catching (anchoring)) is a predetermined acceleration or more or the pull-out acceleration of the webbing 40 from the spool 20 is a specific acceleration or more, the lock member (not shown in the drawings) of the lock mechanism engages with a gear portion 44 of the lock gear 42, so that the rotation of the lock gear 42 in the pull out direction (in the direction indicated by the arrow B of FIG. 1) is inhibited (locked).

As illustrated in FIG. 1, a force limiter mechanism 50 is provided inside the penetration hole 22 of the spool 20. The force limiter mechanism 50 includes the shaft-like main torsion shaft 52, and the main torsion shaft 52 is accommodated inside the main torsion shaft accommodating portion 26 of the spool 20. The main torsion shaft 52 are disposed so as to be coaxial with the spool 20 and the lock gear 42, and is inserted into the penetration hole 46 of the lock gear 42. In the main torsion shaft 52, a spline-like first attachment portion 54 is formed at the center portion in the length direction, and a spline-like second attachment portion 56 is formed in the end portion at one side in the axial direction (the direction indicated by the arrow C illustrated in FIG. 1) in the same way. Further, the second attachment portion 56 is provided with a columnar shaft portion 58, and the shaft portion 58 protrudes from the second attachment portion 56 toward one side in the axial direction of the main torsion shaft 52 (see FIG. 2).

By the first attachment portion 54 engaging with the engagement portion 48 of the lock gear 42, the main torsion shaft 52 is fixed to the lock gear 42 so as to be rotatable together. Further, by the second attachment portion 56 engaging with the engagement portion 36 of the spool 20, the main torsion shaft 52 is fixed to the spool 20 so as to be rotatable together. Furthermore, the shaft portion 58 protrudes into the sub-torsion shaft accommodating portion 24.

A portion of the main torsion shaft 52 between the first attachment portion 54 and the second attachment portion 56 is configured as a first energy absorbing portion 59 which absorbs the kinetic energy of a passenger pulling out of the webbing 40 as described below.

A trigger wire 60 is formed at the side portion of the main torsion shaft 52. A base end portion 60A of the trigger wire 60 is inserted into a hole portion 49 which is formed at the outside in the radial direction in relation to the penetration hole 46 of the lock gear 42 so as to be caught to the lock gear 42. On the other hand, the tip end side of the trigger wire 60 in relation to the base end portion 60A is inserted into the hole portion 38 which is formed in the spool 20 in parallel to the penetration hole 22, and a tip end portion 40B protrudes from the spool 20 toward one side in the axial direction.

The shaft-like sub-torsion shaft 64 serving as the torsion shaft constituting the force limiter mechanism 50 is accommodated in the sub-torsion shaft accommodating portion 24 of the spool 20. The sub-torsion shaft 64 is disposed so as to be coaxial with the main torsion shaft 52, and the portion of the sub-torsion shaft 64 at one side in the axial direction (the direction indicated by the arrow C illustrated in FIG. 1) protrudes from one end of the axial direction of the spool 20.

Figure 6A:
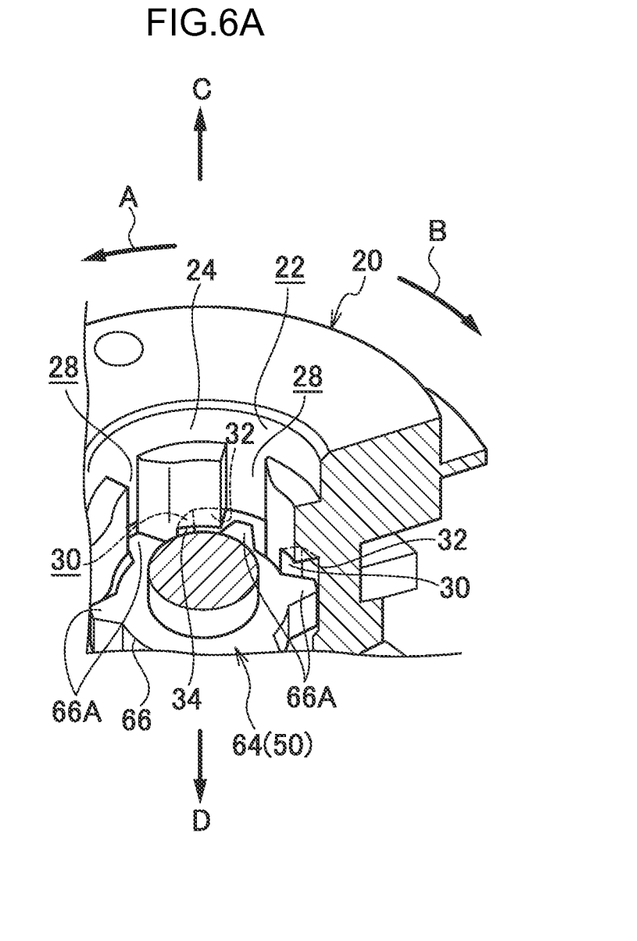
FIG. 6A is a partially cut-away view illustrating a state where a engaged protrusion of the sub-torsion shaft illustrated in FIG. 2 is inserted into an insertion groove portion of the spool.
Figure 6B:
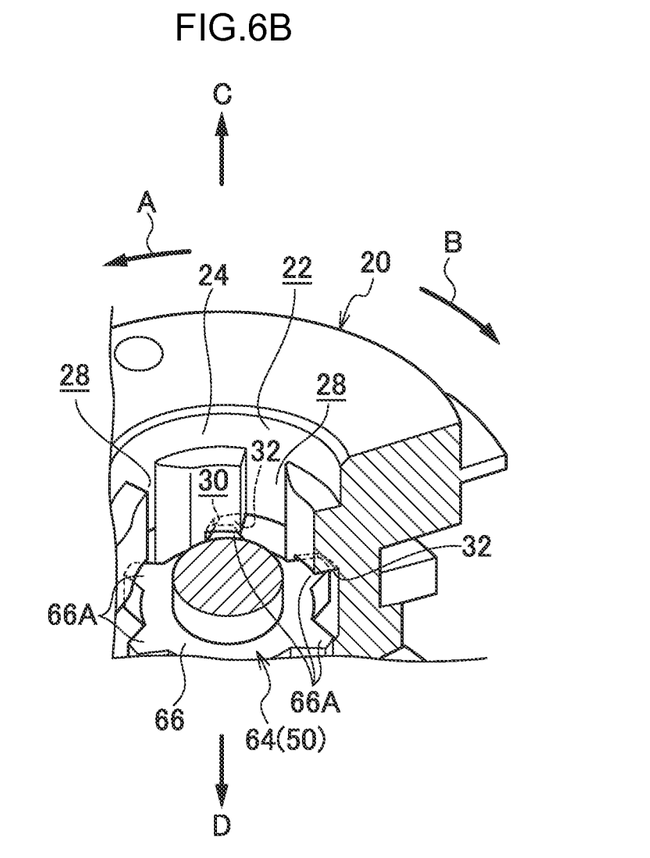
FIG. 6B is a partially cut-away perspective view illustrating a state where the engaged protrusion is disposed inside the engagement groove portion.

The end portion of the sub-torsion shaft 64 at the other side in the axial direction (the direction indicated by the arrow D illustrated in FIG. 1) is provided with a substantially disk-like first attachment portion 66, and the first attachment portion 66 is formed so as to be insertable into the sub-torsion shaft accommodating portion 24. The outer peripheral portion of the first attachment portion 66 is provided with plural (in the embodiment, four) engaged protrusions 66A which serve as engaged portions and have a substantially trapezoid cross-section, and the engaged protrusions 66A protrude from the outer peripheral portion of the first attachment portion 66 outward in the radial direction of the first attachment portion 66. Further, the engaged protrusions 66A are arranged at a predetermined interval in the circumferential direction of the first attachment portion 66 so as to correspond to the insertion groove portions 28, and are formed so as to be insertable into the insertion groove portions 28. In addition, the engaged protrusion 66A is disposed inside the engagement groove portion 30 of the spool 20, and engages with the axial catching surface 32 and circumferential catching surface 34 of the engagement groove portion 30 (see FIG. 6B). Accordingly, the movement of the sub-torsion shaft 64 toward one side in the axial direction and the winding direction (the direction indicated by the arrow A illustrated in FIG. 1) is inhibited.

The end portion of the sub-torsion shaft 64 at one side in the axial direction is provided with a spline-like second attachment portion 68. The portion of the sub-torsion shaft 64 between the first attachment portion 66 and the second attachment portion 68 is configured as a second energy absorbing portion 70 which absorbs the kinetic energy of a passenger pulling out the webbing 40 as described below, and the second energy absorbing portion 70 is formed in a shaft shape having a circular cross-section.

A resinous stopper 80 serving as an inhibiting portion is provided at the second energy absorbing portion 70. The stopper 80 includes an annular main body portion 82 which is partially opened, and the second energy absorbing portion 70 is inserted into the main body portion 82, so that the stopper 80 is assembled to the sub-torsion shaft 64. Further, the stopper 80 is configured so as to be movable with respect to the sub-torsion shaft 64 in the axial direction of the sub-torsion shaft 64, and is configured to be rotatable about the axis of the sub-torsion shaft 64.

Figure 6C:
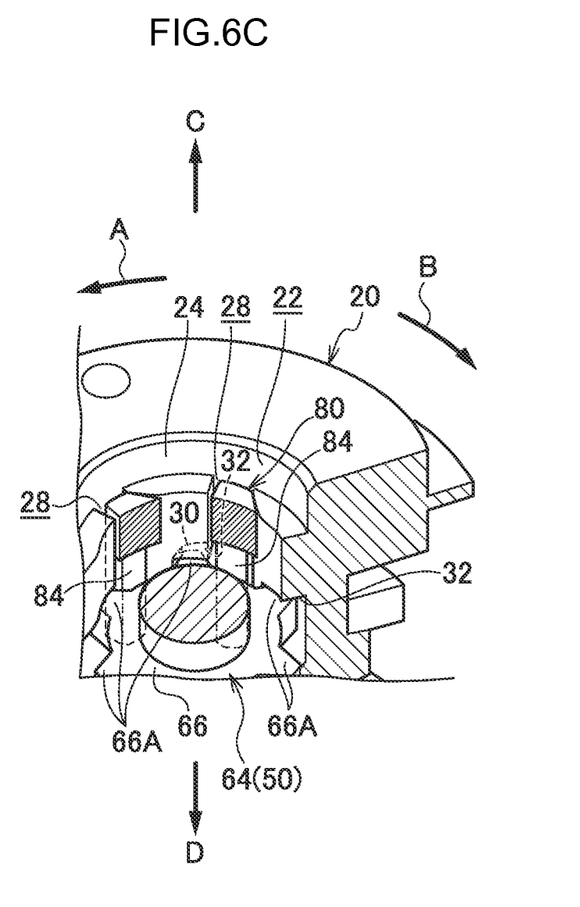
FIG. 6C is a partially cut-away perspective view illustrating a state where a fitting pin of the stopper is fitted into the insertion groove portion.

The outer peripheral portion of the main body portion 82 is integrally provided with plural (in the embodiment, four) fitting pins 84 which have a substantially trapezoid cross-section. The fitting pins 84 are arranged at a predetermined interval along the circumferential direction of the main body portion 82 so as to correspond to the insertion groove portions 28, and extend along the axial direction of the sub-torsion shaft 64. Further, the fitting pin 84 is fitted into the insertion groove portion 28 of the spool 20, and is disposed at the side of the engaged protrusion 66A which is at the pull out direction (the direction indicated by the arrow B of FIG. 6C) side so as to stop (catch) the engaged protrusion 66A in the pull out direction. Accordingly, the movement (the rotation) of the engaged protrusion 66A in the pull out direction is inhibited by the fitting pin 84, and the sub-torsion shaft 64 is fixed to the spool 20 so as to be rotatable together.

As illustrated in FIG. 2, a substantially disk-like washer 90 is provided between the sub-torsion shaft 64 and the main torsion shaft 52 inside the engagement groove portions 30 of the spool 20, and the shaft portion 58 of the main torsion shaft 52 penetrates the washer 90.

Furthermore, a substantially disk-like stopper push 92 is provided between the sub-torsion shaft 64 and the washer 90 inside the engagement groove portions 30 of the spool 20. The center portion of the stopper push 92 protrudes toward the sub-torsion shaft 64, and the shaft portion 58 of the main torsion shaft 52 is fitted into the center portion.

As illustrated in FIG. 1, a sleeve 96 serving as a fastened member is provided at the stopper 80 at one side in the axial direction of the sub-torsion shaft 64. The sleeve 96 is formed in a substantially cylindrical shape, and is disposed so as to be coaxial with the sub-torsion shaft 64. A penetration hole 98 which penetrates in the axial direction is formed in the axis center portion of the sleeve 96, and the sub-torsion shaft 64 is loosely inserted into the penetration hole 98. Further, a spline-like engagement portion 100 is formed in the inner peripheral portion at one side in the axial direction of the sleeve 96 (in the direction indicated by the arrow C illustrated in FIG. 1), and the second attachment portion 68 of the sub-torsion shaft 64 engages with the engagement portion 100. Accordingly, the sleeve 96 is fixed to the sub-torsion shaft 64 so as to be rotatable together.

Furthermore, a screw 110 is provided at one side in the axial direction of the sub-torsion shaft 64. The screw 110 includes a screw portion 112 and a push portion 114 which is larger in diameter than the screw portion 112. The screw portion 112 is threaded into a screw hole 65 which is formed in the tip end portion of the sub-torsion shaft 64, so that the screw 110 is fixed to the tip end portion of the sub-torsion shaft 64. Further, in this way, in a state where the screw 110 is fixed to the tip end portion of the sub-torsion shaft 64, the push portion 114 comes into contact with one end of the sleeve 96 at one side in the axial direction. Accordingly, the sleeve 96 is fastened to the spool 20, and the movement of the sleeve 96 and the stopper 80 with respect to the sub-torsion shaft 64 toward one side in the axial direction is restricted.

Furthermore, a clutch mechanism and a switching mechanism (not shown in the drawings) are provided at the side of the leg piece 16 of the frame 12, and the clutch mechanism is connected to the sleeve 96. Further, the clutch mechanism is configured to be operated in a manner such that the tip end portion 40B of the trigger wire 60 is pulled toward the other side in the axial direction of the spool 20 with respect to the hole portion 38. Furthermore, when the clutch mechanism is operated, the clutch mechanism is connected to the switching mechanism, and the rotation of the sleeve 96 is transmitted to the switching mechanism through the clutch mechanism.

The switching mechanism is configured to switch between a state in which the transmitted rotation is inhibited and a state in which the rotation is permitted, and is connected to a control device (not shown in the drawings), so that the switching mechanism is operated by the control device. Then, the switching mechanism inhibits the transmitted rotation (so that the sleeve 96 is not rotatable) before the switching mechanism is operated, and the switching mechanism permits the transmitted rotation (so that the sleeve 96 is rotatable) when the switching mechanism is operated.

Further, the control device is electrically connected to a collision detecting unit (not shown in the drawings). The collision detecting unit predicts the collision of the vehicle through, for example, an acceleration sensor which detects the acceleration (especially rapid deceleration) of the vehicle or a distance measuring sensor which detects the distance up to the obstacle in front of the vehicle. Further, the collision detecting unit is configured to detect the collision of the vehicle in a manner such that the acceleration sensor detects the collision acceleration larger than or equal to a predetermined reference value.

Furthermore, the control device is electrically connected to a body shape detecting unit (not shown in the drawings), and the body shape detecting unit detects the body shape of the passenger sitting on a seat through, for example, a load sensor, a belt sensor, a seat position sensor, or the like. Specifically, the load sensor detects the load acting on the seat of the vehicle, and the body shape detecting unit detects the body shape of the passenger based on the detected load. Further, the belt sensor detects the pull out amount of the webbing 40 from the spool 20, and the body shape detecting unit detects the body shape of the passenger based on the detected pull out amount. Furthermore, the seat position sensor includes a position detecting sensor which detects the slide position in the front-back direction of the seat of the vehicle or a camera sensor which is formed in the interior of the vehicle, and the body shape detecting unit detects the body shape of the passenger based on the position of the seat detected by the seat position sensor.

Then, in a case in which the control device determines that the body shape of the passenger is less than a predetermined reference value based on the signal from the body shape detecting unit, and the collision of the vehicle occurs based on the signal from the collision detecting unit, the switching mechanism is operated by the control device.

Here, the webbing winding device 10 according to the embodiment is configured to be operated as below.

That is, the spool 20, the lock gear 42, the main torsion shaft 52, the sub-torsion shaft 64, and the sleeve 96 are configured to be rotatable together in the winding direction and the pull out direction.

When the webbing 40 is pulled out from the spool 20, the webbing 40 is mounted on the body of the passenger of the vehicle.

In a state where the webbing 40 is mounted on the body of the passenger of the vehicle, for example, when the vehicle is rapidly decelerated and the lock mechanism is operated, the rotation of the lock gear 42 in the pull out direction is inhibited.

Accordingly, the rotation of the spool 20 connected to the lock gear 42 through the main torsion shaft 52 in the pull out direction is restricted, so that the webbing 40 is restricted from being pulled out from the spool 20. Accordingly, the body of the passenger which is about to move in the front direction of the vehicle is restrained by the webbing 40.

Further, when the body of the passenger pulls put the webbing 40 by the larger force while the rotation of the lock gear 42 in the pull out direction is inhibited, and the rotational force of the spool 20 in the pull out direction based on this tensile force becomes larger than the anti-twisting load (the anti-deformation load) of the first energy absorbing portion 59 of the main torsion shaft 52, the force limiter mechanism 50 is operated, so that the rotation of the spool 20 in the pull out direction with a load which is larger than or equal to the force limiter load (the anti-twisting load of the first energy absorbing portion 59) is permitted by the twisting (the deformation) of the first energy absorbing portion 59.

Accordingly, when the spool 20 rotates in the pull out direction by the twisting of the first energy absorbing portion 59 so that the webbing 40 is pulled out from the spool 20, the load (the burden) on the chest of the passenger by the webbing 40 is reduced, and the kinetic energy of the passenger pulling (stretching) of the webbing 40 is absorbed by the twisted amount of the first energy absorbing portion 59.

On the other hand, as described above, the state in which the spool 20 rotates in the pull out direction with respect to the lock gear 42 corresponds to the state in which the lock gear 42 relatively rotates in the winding direction with respect to the spool 20. Accordingly, when the lock gear 42 relatively rotates in the winding direction with respect to the spool 20, the base end portion 60A of the trigger wire 60 moves in the circumferential direction of the main torsion shaft 52 while the tip end side in relation to the base end portion 60A of the trigger wire 60 is inserted in the hole portion 38 of the spool 20, the tip end portion 40B of the trigger wire 60 is stretched (pulled) toward the other side in the axial direction of the spool 20 with respect to the hole portion 38.

Accordingly, the clutch mechanism is operated, so that the clutch mechanism and the switching mechanism are connected to each other. For this reason, the rotation of the sleeve 96 is transmitted to the switching mechanism through the clutch mechanism. In this state, since the rotation of the sleeve 96 is disabled by the switching mechanism, the body of the passenger stretches (pulls out) the webbing 40 by the larger force in this state. When the rotational force of the spool 20 in the pull out direction based on the tensile force becomes larger than the sum of the anti-twisting load (the anti-deformation load) of the first energy absorbing portion 59 of the main torsion shaft 52 and the anti-twisting load (the anti-deformation load) of the second energy absorbing portion 70 of the sub-torsion shaft 64, the rotation in the pull out direction with a load which is larger than or equal to the force limiter load of the spool 20 (the sum of the anti-twisting load of the first energy absorbing portion 59 and the anti-twisting load of the second energy absorbing portion 70) is permitted by the twisting (the deformation) of the first energy absorbing portion 59 and the second energy absorbing portion 70.

Accordingly, when the spool 20 rotates in the pull out direction by the twisting of the first energy absorbing portion 59 and the second energy absorbing portion 70 so that the webbing 40 is pulled out from the spool 20, the load (the burden) on the chest of the passenger by the webbing 40 is reduced, and the kinetic energy of the passenger pulling (stretching) of the webbing 40 is absorbed by the twisted amount of the first energy absorbing portion 59 and the second energy absorbing portion 70.

On the other hand, in a case in which the control device determines that the body shape of the passenger is less than a predetermined reference value based on the signal from the body shape detecting unit and the collision of the vehicle occurs based on the signal of the collision detecting unit, the switching mechanism is operated by the control device. For this reason, since the rotation of the sleeve 96 is permitted (so that the sleeve 96 is rotatable), the second energy absorbing portion 70 is not twisted. Accordingly, the rotation of the spool 20 in the pull out direction with a load which is larger than or equal to the force limiter load (the anti-twisting load of the first energy absorbing portion 59) is permitted by the twisting (the deformation) of the first energy absorbing portion 59.

That is, in a case in which the body shape of the passenger is larger than or equal to a predetermined reference value, the force limiter load becomes high so as to become the sum of the anti-twisting load of the first energy absorbing portion 59 and the anti-twisting load of the second energy absorbing portion 70. On the other hand, in a case in which the body shape of the passenger is less than a predetermined reference value and the collision of the vehicle is detected, the force limiter load becomes low so as to become the anti-twisting load of the first energy absorbing portion 59. For this reason, the passenger can be appropriately protected in accordance with the body shape.

Next, the operation and the effect of the embodiment will be described by describing the procedure of assembling the sub-torsion shaft 64 to the spool 20.

At the time when the sub-torsion shaft 64 is assembled to the spool 20, the main torsion shaft 52 has already assembled to the spool 20, and the washer 90 and the stopper push 92 are arranged inside the sub-torsion shaft accommodating portion 24.

Figure 5A:
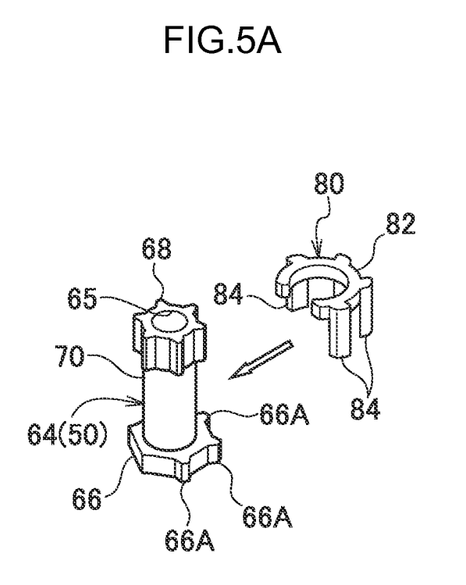
FIG. 5A is a partially cut-away perspective view when a stopper is formed as a sub-assembly in the sub-torsion shaft illustrated in FIG. 2.

First, as illustrated in FIG. 5A, the second energy absorbing portion 70 of the sub-torsion shaft 64 is inserted from the opening portion of the main body portion 82 of the stopper 80 into the main body portion 82, so that the stopper 80 is assembled to the second energy absorbing portion 70. Accordingly, the stopper 80 and the sub-torsion shaft 64 are formed as a sub-assembly, the stopper 80 is relatively movable in the axial direction of the sub-torsion shaft 64 with respect to the sub-torsion shaft 64, and is relatively rotatable about the axis of the sub-torsion shaft 64.

Figure 5B:
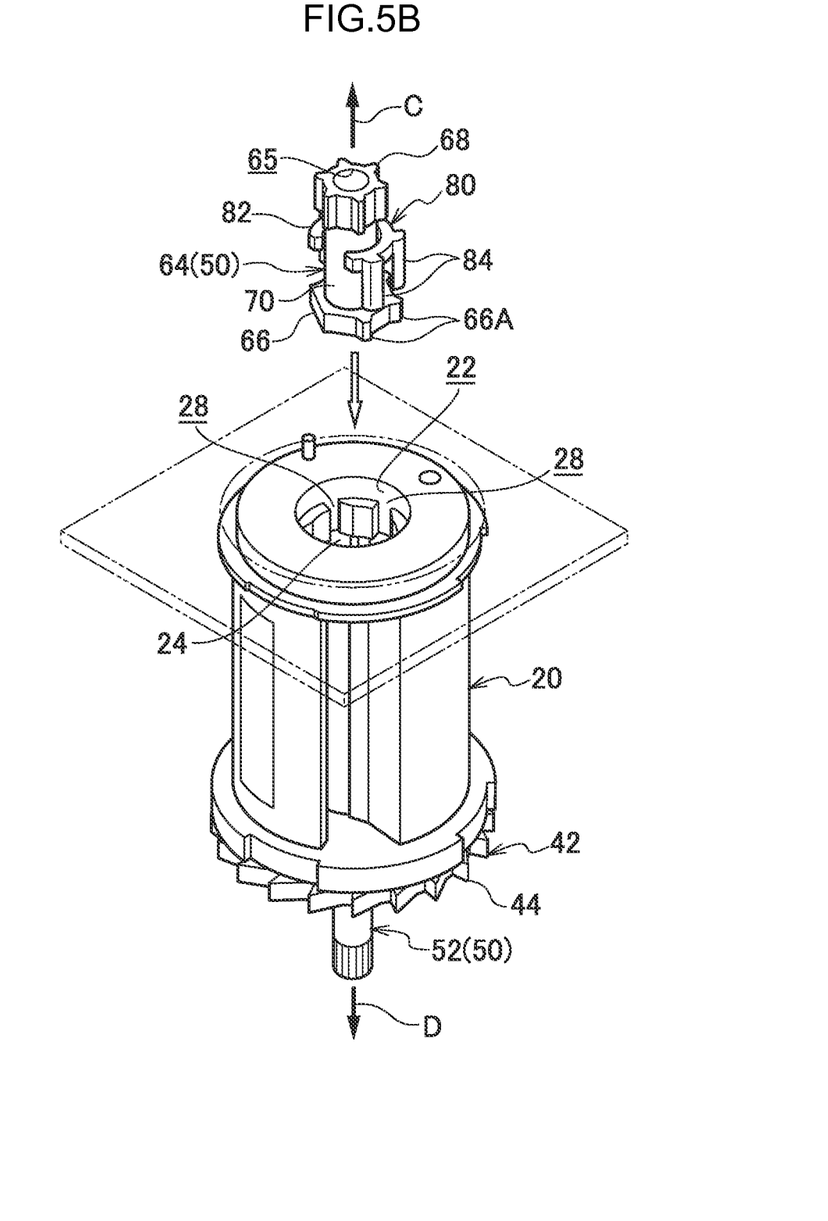
FIG. 5B is a perspective view illustrating a state before the sub-torsion shaft and the stopper formed as the sub-assembly are inserted into the spool.
Figure 5C:
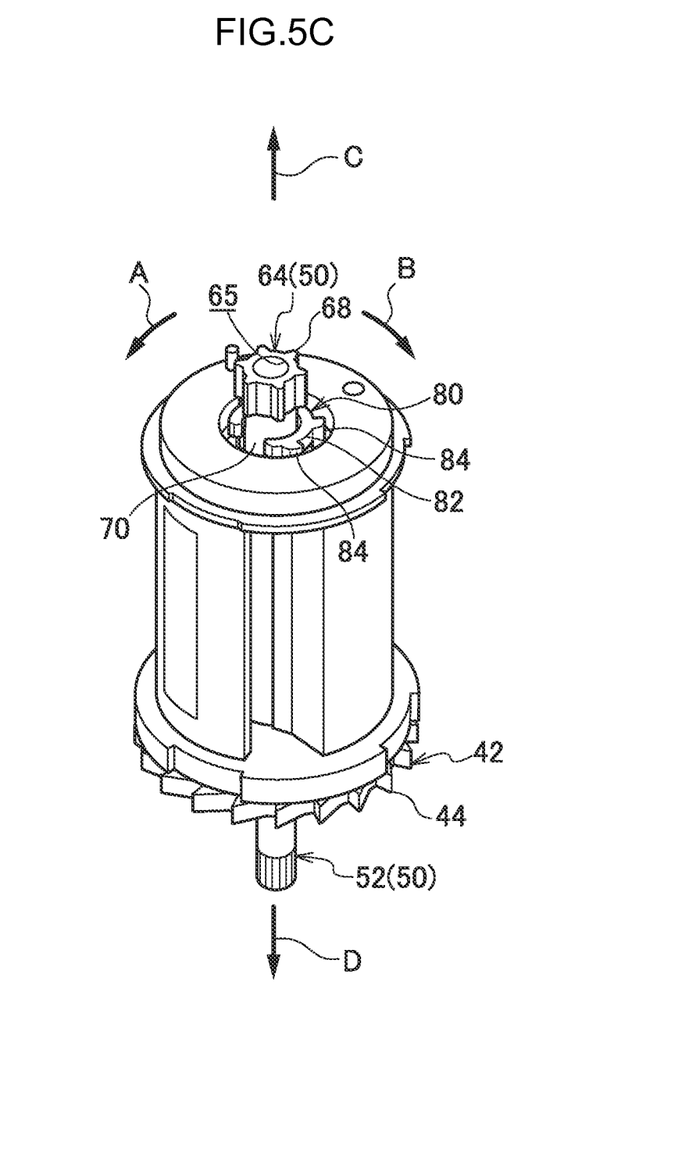
FIG. 5C is a perspective view illustrating a state where the sub-torsion shaft and the stopper are inserted into the spool.

In this state, the sub-torsion shaft 64 is inserted from one side in the axial direction of the spool 20 into the sub-torsion shaft accommodating portion 24 of the spool 20 (see FIG. 5B). At this time, the first attachment portion 66 of the sub-torsion shaft 64 is inserted through the sub-torsion shaft accommodating portion 24, and the engaged protrusion 66A of the sub-torsion shaft 64 are inserted through the insertion groove portions 28 of the spool 20 (see FIG. 6A). Then, the engaged protrusion 66A reaches the portion of the insertion groove portion 28 at the other side in the axial direction of the spool 20, thereafter, the sub-torsion shaft 64 is rotated in the winding direction (the sub-torsion shaft is rotated in the direction indicated by the arrow A in the state of FIG. 5C). Accordingly, the engaged protrusions 66A are disposed inside the engagement groove portions 30 of the spool 20 (the engaged protrusion 66A is disposed from the state illustrated in FIG. 6A to the state illustrated in FIG. 6B), so that the engaged protrusion 66A engages with the axial catching surface 32 and circumferential catching surface 34 of the engagement groove portion 30. Accordingly, the movement of the sub-torsion shaft 64 toward one side in the axial direction and the winding direction is inhibited. Furthermore, in this state, since the washer 90 and the stopper push 92 are arranged inside the sub-torsion shaft accommodating portion 24, the movement of the sub-torsion shaft 64 toward the outside in the axial direction is restricted.

Figure 7A:
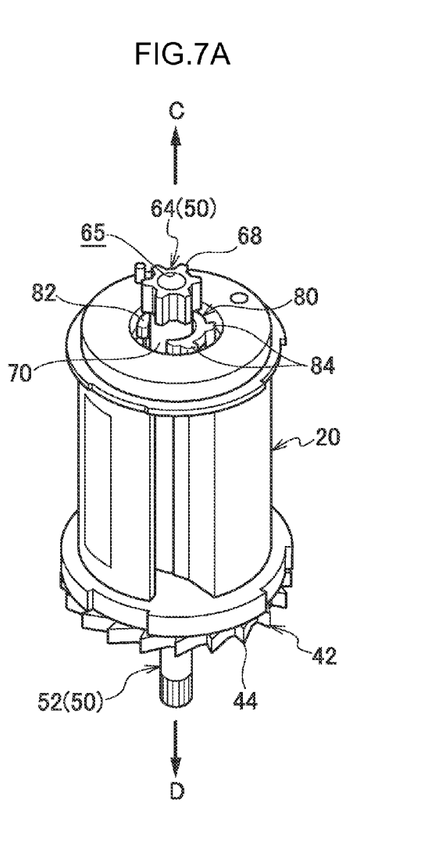
FIG. 7A is a perspective view illustrating a state before the stopper moves in the state illustrated in FIG. 5C.
Figure 7B:
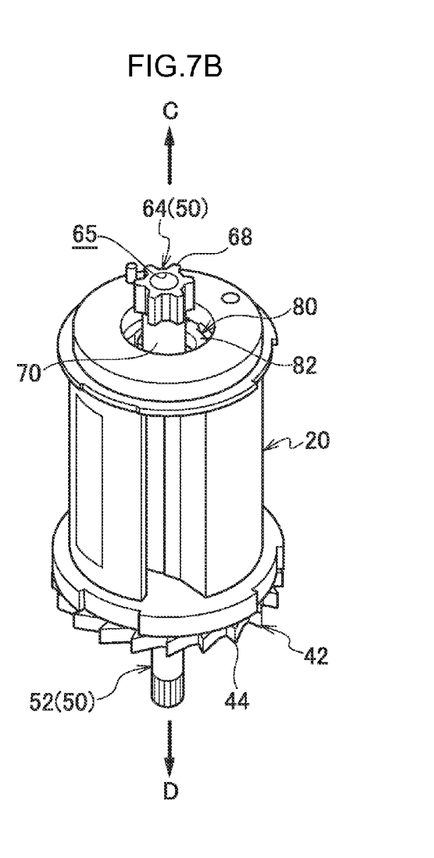
FIG. 7B is a perspective view illustrating a state where the stopper moves inside the spool from the state of FIG. 7A.

Subsequently, the stopper 80 is rotated about the axis of the sub-torsion shaft 64 so as to align the fitting pins 84 of the stopper 80 to the insertion groove portions 28 of the spool 20, and the stopper 80 is moved toward the other side of the sub-torsion shaft 64 in the axial direction (from the state of FIG. 7A to the state of FIG. 7B). Accordingly, the fitting pin 84 is fitted into the insertion groove portion 28 (see FIG. 6C) so as to be disposed at the side of the engaged protrusion 66A which is at the pull out direction, so that the fitting pin 84 stops (catches) the engaged protrusion 66A. Accordingly, since the rotation of the engaged protrusion 66A in the pull out direction is restricted by the fitting pin 84, the rotation of the sub-torsion shaft 64 in the pull out direction is inhibited.

Then, the sleeve 96 is inserted from one side in the axial direction of the spool 20 into the sub-torsion shaft accommodating portion 24, and the sub-torsion shaft 64 is disposed inside the sleeve 96.

In this state, the screw 110 is threaded into the screw hole 65 of the sub-torsion shaft 64. Accordingly, the push portion 114 of the screw 110 comes into contact with the sleeve 96, so that the sleeve 96 is fastened to the spool 20. Further, at this time, the position of the screw 110 in the axial direction of the spool 20 is set to the position of one end side of the sleeve 96 in the axial direction. For this reason, when the screw 110 is threaded into the sub-torsion shaft 64, the axial force acts on the sub-torsion shaft 64 in one side in the axial direction, so that the engaged protrusion 66A of the sub-torsion shaft 64 is fastened to the axial catching surface 32 of the spool 20 by the axial force. With the above-described configuration, the sub-torsion shaft 64 is assembled to the spool 20 so as not to be separable therefrom.

In this way, at the time of assembling the sub-torsion shaft 64 to the spool 20, the sub-torsion shaft 64 is inserted from one side in the axial direction of the spool 20 into the spool 20. Subsequently, by rotating the sub-torsion shaft 64 in the winding direction, the movement of the sub-torsion shaft 64 toward one side in the axial direction and the winding direction with respect to the spool 20 is inhibited. Subsequently, by the stopper 80 being fitted from one side in the axial direction of the spool 20 into the insertion groove portions 28, the movement of the sub-torsion shaft 64 in the pull out direction with respect to the spool 20 is inhibited. Accordingly, the sub-torsion shaft 64 is assembled to the spool 20 so as not to be separable therefrom. Accordingly, the direction in which the sub-torsion shaft 64 is assembled to the spool 20 becomes only a direction parallel to the axial direction of the spool 20. With the above-described configuration, the assembly of the sub-torsion shaft 64 to the spool 20 may be improved.

Further, since the stopper 80 is provided at the sub-torsion shaft 64, the sub-torsion shaft 64 can be assembled to the spool 20 in a state where the stopper 80 and the sub-torsion shaft 64 are made as a sub-assembly (the stopper 80 is sub-assembled to the sub-torsion shaft 64). Accordingly, the assembility of the sub-torsion shaft 64 to the spool 20 can be further improved.

Furthermore, the stopper 80 is configured to be movable in the axial direction of the sub-torsion shaft 64 and be rotatable about the axis of the sub-torsion shaft 64. For this reason, when the stopper 80 is rotated about the axis of the sub-torsion shaft 64 before the fitting pin 84 of the stopper 80 is fitted into the insertion groove portion 28, the positions of the fitting pin 84 and the insertion groove portion 28 can be easily aligned with each other. Furthermore, the sub-torsion shaft 64 serves as a guide member at the time of fitting the fitting pin 84 into the insertion groove portion 28, so that the stopper 80 can be moved along the axial direction of the sub-torsion shaft 64.

Further, the engaged protrusion 66A of the sub-torsion shaft 64 engages with the circumferential catching surface 34 of the spool 20 in the winding direction. In other words, circumferential catching surface 34 engages with the engaged protrusion 66A in the pull out direction. Accordingly, at a time when the force limiter mechanism 50 is operated (at a time when the sub-torsion shaft 64 is twisted), the direction in which the engagement groove portion 30 engages with the engaged protrusion 66A is equal to the rotation direction (the pull out direction) of the spool 20. Accordingly, the stopper 80 can be provided without affecting the operation of the force limiter mechanism 50.

Furthermore, as described above, the sleeve 96 is disposed at one side in the axial direction of the spool 20 with respect to the stopper 80, and the sub-torsion shaft 64 is disposed inside the sleeve 96. Further, the screw 110 is threaded into the screw hole 65 of the sub-torsion shaft 64, and the screw 110 comes into contact with the sleeve 96, so that the sleeve 96 is fastened to the spool 20. For this reason, since the movement of the stopper 80 toward one side in the axial direction of the spool 20 is inhibited by the sleeve 96, it is possible to reliably prevent the stopper 80 from being separated from the spool 20.

Furthermore, since the position of the screw 110 in the axial direction of the spool 20 is set to the position of the one end of the sleeve 96 in the axial direction, by the screw 110 being threaded into the sub-torsion shaft 64, the axial force in the axial direction one side acts on the sub-torsion shaft 64. Accordingly, the engaged protrusion 66A and the engagement groove portion 30 can be fastened to each other by the axial force, and further the sub-torsion shaft 64 may be fastened to the spool 20.

Further, the engaged protrusion 66A of the sub-torsion shaft 64 engages with the axial catching surface 32 and circumferential catching surface 34 of the engagement groove portion 30, and the fitting pin 84 of the stopper 80 stops (catches) the engaged protrusion 66A. Accordingly, since the sub-torsion shaft 64 is not separable from the spool 20 after the fitting pin 84 of the stopper 80 is fitted into the insertion groove portion 28, the assembility at the time of assembling the sleeve 96 and assembling the clutch mechanism from this state can be improved.

Furthermore, the second energy absorbing portion 70 of the sub-torsion shaft 64 is inserted from the opening portion of the main body portion 82 of the stopper 80 into the main body portion 82, so that the stopper 80 is assembled to the second energy absorbing portion 70. For this reason, the stopper 80 is attachable to and detachable from the sub-torsion shaft 64. Accordingly, the stopper 80 can be easily made to be a sub-assembly in the sub-torsion shaft 64, and the assembility of the sub-torsion shaft 64 to the spool 20 can be further improved.

Furthermore, in the embodiment, although the invention is applied to the assembly structure of the spool 20 and the sub-torsion shaft 64, the invention may be applied to the assembly structure of the spool 20 and the main torsion shaft 52. Further, the invention may be applied to the torsion shaft in which the main torsion shaft 52 and the sub-torsion shaft 64 are integrated with each other. That is, the invention may be applied to the torsion shaft provided inside the spool 20.

Further, in the embodiment, each installation number of the insertion groove portions 28, the engagement groove portions 30, the engaged protrusions 66A, and the fitting pins 84 is four, but the number may be one or more.

Furthermore, in the embodiment, when the control device determines that the body shape of the passenger is less than a predetermined reference value based on the signal from the body shape detecting unit and determines that the collision of the vehicle occurs based on the signal of the collision detecting unit, the switching mechanism is operated by the control device, but the timing at which the switching mechanism is operated may be arbitrarily set. For example, when the control device determines that the body shape of the passenger is less than a predetermined reference value and determines that the collision of the vehicle occurs, the switching mechanism may be operated after a predetermined specific time is elapsed.

Further, as described above, in the embodiment, when the control device determines that the body shape of the passenger is less than a predetermined reference value and that the collision of the vehicle occurs, the switching mechanism is operated by the control device. Instead of this configuration, the switching mechanism may be operated by the control device when the control device determines that the acceleration of the vehicle is less than a predetermined reference value based on the signal of the collision detecting unit and that the collision of the vehicle occurs. Accordingly, the load value of the force limiter load may be switched in accordance with the acceleration of the vehicle.

What is claimed is:

1. A webbing winding device comprising:
    a spool that is formed in a cylindrical shape and is rotatable;
    an insertion groove portion that is formed at an inner peripheral portion of the spool and extends in an axial direction of the spool;
    an engagement groove portion that is formed at the inner peripheral portion of the spool, communicates with the insertion groove portion and extends in a circumferential direction from the insertion groove portion toward one side in a rotation direction of the spool;
    a torsion shaft that is coaxially provided inside the spool;
    an engaged portion that is integrally formed with the torsion shaft, and is configured such that the engaged portion is inserted from one side in the axial direction of the spool into the insertion groove portion and is rotated from an inside of the insertion groove portion toward the one side in the rotation direction of the spool so as to engage with the engagement groove portion, whereby movement of the engaged portion with respect to the spool toward the one side in the rotation direction of the spool and the one side in the axial direction is inhibited; and
    an inhibiting portion that is fitted from the one side in the axial direction into the insertion groove portion and inhibits movement of the engaged portion with respect to the spool toward the other side in the rotation direction of the spool by blocking the engaged portion,
    the inhibiting portion which is fitted into the insertion groove portion being positioned at the other side in the rotation direction of the spool with respect to the engaged portion which is engaged with the engagement groove portion such that the engaged portion is obstructed from moving along the insertion groove portion.

2. The webbing winding device of claim 1, wherein the inhibiting portion is provided at the torsion shaft so as to be movable in an axial direction of the torsion shaft and be rotatable about an axis of the torsion shaft.

3. The webbing winding device of claim 2, wherein the one side in the rotation direction corresponds to a winding direction in which a webbing is wound on the spool.

4. The webbing winding device of claim 2, further comprising:
    a fastened member that is formed in a cylindrical shape, and is arranged at the one side in the axial direction with respect to the inhibiting portion so as to be integrally rotatable with the torsion shaft, the torsion shaft being disposed inside the fastened member; and
    a fastening member that includes a screw portion and a contact portion, the screw portion being threaded into an end portion of the torsion shaft at the one side in the axial direction, and the contact portion coming into contact with the fastened member, so as to fasten the fastened member to the spool.

5. The webbing winding device of claim 2, wherein a fitting portion extending along the axial direction is provided at the inhibiting portion.

6. The webbing winding device of claim 5, wherein plural insertion groove portions, the engagement groove portions, the engaged portions and fitting portions are provided.

7. The webbing winding device of claim 6, wherein the engaged portions are provided at the torsion shaft and the fitting portions are provided at the inhibiting portion so as to correspond to positions of the insertion groove portions at the inner peripheral portion of the spool in a circumferential direction.

8. The webbing winding device of claim 1, wherein the one side in the rotation direction corresponds to a winding direction in which a webbing is wound on the spool.

9. The webbing winding device of claim 8, further comprising:
    a fastened member that is formed in a cylindrical shape, and is arranged at the one side in the axial direction with respect to the inhibiting portion so as to be integrally rotatable with the torsion shaft, the torsion shaft being disposed inside the fastened member; and a fastening member that includes a screw portion and a contact portion, the screw portion being threaded into an end portion of the torsion shaft at the one side in the axial direction, and the contact portion coming into contact with the fastened member, so as to fasten the fastened member to the spool.

10. The webbing winding device of claim 1, further comprising:

a fastened member that is formed in a cylindrical shape, and is arranged at the one side in the axial direction with respect to the inhibiting portion so as to be integrally rotatable with the torsion shaft, the torsion shaft being disposed inside the fastened member; and a fastening member that includes a screw portion and a contact portion, the screw portion being threaded into an end portion of the torsion shaft at the one side in the axial direction, and the contact portion coming into contact with the fastened member, so as to fasten the fastened member to the spool.

11. The webbing winding device of claim 1, wherein a fitting portion extending along the axial direction is provided at the inhibiting portion.

12. The webbing winding device of claim 11, wherein plural insertion groove portions, the engagement groove portions, the engaged portions and fitting portions are provided.

13. The webbing winding device of claim 12, wherein the engaged portions are provided at the torsion shaft and the fitting portions are provided at the inhibiting portion so as to correspond to positions of the insertion groove portions at the inner peripheral portion of the spool in a circumferential direction.

* * * * *